Sept. 30, 1952 D. C. FELT 2,612,051

TUNING MECHANISM

Filed Sept. 27, 1951

INVENTOR.
DAVID C. FELT
BY Darby & Darby
ATTORNEYS

Patented Sept. 30, 1952 2,612,051

UNITED STATES PATENT OFFICE 2,612,051

TUNING MECHANISM

David C. Felt, Teaneck, N. J., assignor to Allen B. Du Mont Laboratories, Inc., Clifton, N. J., a corporation of Delaware Application September 27, 1951, Serial No. 248,526

5 Claims. (Cl. 74—10.41)

Figure 1:
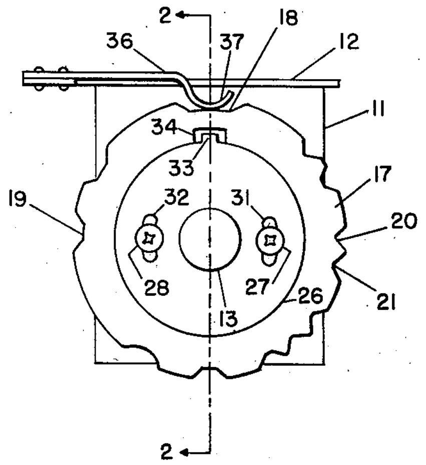

The invention relates to tuning mechanisms for radio and television receivers and the like wherein a shaft is rotated, and is particularly related to such a device which may be adjusted to predetermined positions.

An object of the invention is to provide a shaft-turning mechanism having preset positions combined with a precision-adjustment means.

A further object is to provide a television tuning mechanism wherein a tuning shaft may be readily set at predetermined positions representing television channels and which has incorporated therein sufficient lost motion to permit precise adjustment of tuning for each channel.

Other objects will be apparent.

In the drawing—

Figure 2:
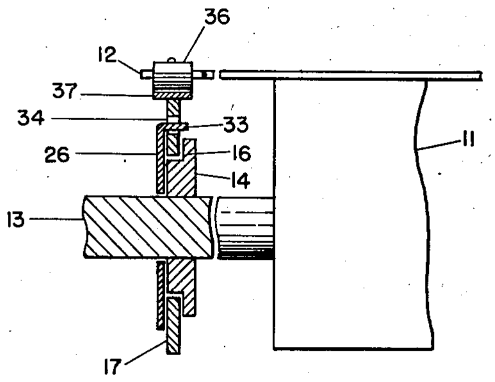

Figure 1 shows a front elevational view of a mechanical tuning mechanism incorporating the invention; and Figure 2 is a longitudinal sectional view through 2—2 of Figure 1.

A tuning device 11 such as the R. F. input circuits for a television receiver, is mounted on a chassis 12 and has extending therefrom a tuning shaft 13. A support disc 14 is securely attached to the end of the shaft 13 and is provided with an annular shoulder 16 upon which is positioned a detent disc 17 having detents 18, 19, 20 and 21 on the periphery thereof. A tongue plate 26 having arcuate slots 31 and 32, is secured to the support disc 14 by suitable means such as screws 27, 28, passing through the slots. These slots 31 and 32 permit relative rotational movement between the disc 14 and the plate 26. A tongue 33 extends laterally from the edge of the tongue plate 26, into and through an arcuate slot 34 complementary positioned and provided therefor in the detent disc 17.

A detent arm 36 is attached to the frame 12 lying in the plane of and extending to the edge of the detent disc 17. A curved portion 37 in the end thereof, is adapted to engage the detents 18, 19, 20 and 21. The detent disc 17 is free to rotate on the support disc 14 over an angle limited by the abutment of the tongue 33 against the ends of the slot 34.

Rotation of the shaft 13, adjusting or tuning the device 11 (normally comprising a variable reactance), causes the tongue 33 to move arcuately within the slot 34 until it abuts against an end thereof whereupon the detent disc rotates with the shaft. As the shaft is rotated to a predetermined position, as tuning between television channels, the curved portion 37 of the detent arm 36 engages a detent, as at 18. The shaft 13 may then be adjusted to obtain precise or fine tuning, over a relatively small angle as determined by the length of the slot 34 and width of the tongue 33, and by the length of the detents 18, 19, 20 and 21.

The arcuate slots 31 and 32 in the tongue plate 26 permit a preset centering adjustment to be made of the tongue 33 in the groove 34, after which the screws 27 and 28 are tightened. This adjustment is generally made during manufacture and need not be changed thereafter.

The tongue 33 and groove 34 provide a fixed amount of lost motion which is effective for all detent settings of the mechanism. Certain tuning positions, however, require a greater angular variation for precise tuning adjustment. This wider angle of adjustment is provided by elongated detents, viz., the detents 18 and 19 which are associated with those positions requiring wider adjustment angle. In the positions in which a greater angular range is required, the lost motion is provided by the elongated detents 18, 19 and by the tongue 33 and groove 34.

Since certain of the predetermined mechanism settings are relatively close together, such as those positions indicated by the detents 20 and 21, there is not sufficient space on the periphery of the detent disc 17 to allow the use of elongated detents. The detents 20 and 21 are shown to be of such sizes as to engage firmly against both ends of the curved portion 37 of the detent arm 36 permitting no lost motion at these angular positions. The tongue 33 and groove 34 provide sufficient lost motion to obtain precise tuning in these positions.

While only a few representative detents are shown in the drawing, any desired number of detents may be employed. Although the novel tuning mechanism has been described particularly in connection with a radio and television tuning device, it may be employed in connection with other types of devices where it is desired to provide predetermined rotary positions for a shaft combined with means for precisely positioning the shaft in each of the predetermined positions. The true scope of the invention is defined by the claims.

What is claimed is:

1. A tuning mechanism for radio and television comprising a rotatable shaft, a disc positioned concentrically on said shaft and having detents on the periphery thereof, means providing a limited lost rotary motion between said shaft and said disc, a detent arm positioned to engage said detents when said disc is rotated, and means providing a limited lost rotary motion between said detent arm and at least one of said detents.

2. A tuning mechanism for radio and television comprising a rotatable shaft, a support disc attached to said shaft and having an annular shoulder thereon, a detent disc rotatably positioned on said shoulder and having an arcuate slot therein and detents on the periphery thereof, a tongue plate attached to said support disc and having a tongue extending into said arcuate slot, said tongue being narrower than the arcuate length of said slot, and a detent arm positioned to engage said detents when said detent disc is rotated.

3. The mechanism of claim 2, in which at least one of said detents is elongated to provide lost motion.

4. The mechanism of claim 2, in which the attachment of said tongue plate to said support disc includes means for rotatably adjusting the position of said plate with respect to said support disc.

5. The mechanism of claim 4, in which said adjusting means comprises an adjustment slot in said plate and an adjustable member extending through said adjustment slot and engaging said support disc.

DAVID C. FELT.

No references cited.